(12) United States Patent
Zia et al.

(10) Patent No.: US 7,296,825 B1
(45) Date of Patent: Nov. 20, 2007

(54) MULTIPLE OUTPUT BUCKLE SWITCH

(75) Inventors: Roseanna N. Zia, Troy, MI (US); Kevin Dewey, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/309,724

(22) Filed: May 11, 1999

(51) Int. Cl.
*B60R 22/48* (2006.01)
*H01H 3/16* (2006.01)
*H01H 13/62* (2006.01)

(52) U.S. Cl. ............... 280/801.1; 200/61.58 B; 180/268

(58) Field of Classification Search ......... 280/801.1, 280/801.2, 802, 805, 807, 808; 200/61.58 B; 24/196; 180/268
See application file for complete search history.

(56) References Cited

U.S. PATENT DOCUMENTS

| | | |
|---|---|---|
| 3,624,601 A | 11/1971 | Routzahn et al. |
| 3,633,697 A | 1/1972 | Silver |
| 3,665,385 A | 5/1972 | Booth |
| 3,718,902 A | 2/1973 | Pearsall |
| 3,729,059 A | 4/1973 | Redmond |
| 3,737,850 A | 6/1973 | Kopp |
| 3,740,711 A | 6/1973 | Bell |
| 3,748,640 A | 7/1973 | Sardo, Jr. |
| 3,756,339 A | 9/1973 | Cornelison, Jr. et al. |
| 3,757,293 A | 9/1973 | Petersen, III |
| 3,766,612 A | 10/1973 | Hattori |
| 3,767,134 A | 10/1973 | Morales |
| 3,770,225 A | 11/1973 | Boblitz |
| 3,770,919 A | 11/1973 | Lewis |
| 3,781,497 A | 12/1973 | Stephenson et al. |
| 3,787,804 A | 1/1974 | MacDonald |
| 3,806,867 A | 4/1974 | Quantz |
| 3,815,086 A | 6/1974 | Minton et al. |
| 3,830,444 A | 8/1974 | Sargeant |
| 3,831,140 A | 8/1974 | Anderson, Jr. et al. |
| 3,833,781 A | 9/1974 | Rumpf |
| 3,871,090 A | 3/1975 | Romanzi, Jr. et al. |
| 3,891,272 A | 6/1975 | Takada |
| 3,944,766 A | 3/1976 | Wood |
| 3,956,603 A | 5/1976 | Fisher |
| 3,963,090 A | 6/1976 | Hollins |
| 3,969,795 A | 7/1976 | Stephenson |
| 4,000,385 A | 12/1976 | Colasanti |
| 4,001,532 A | 1/1977 | Kubota et al. |
| 4,012,612 A | 3/1977 | Loomba |
| 4,027,362 A | 6/1977 | Hart et al. |
| 4,060,878 A | 12/1977 | Dyki |
| 4,060,879 A | 12/1977 | Takada |
| 4,064,603 A | 12/1977 | Romanzi, Jr. |
| 4,128,924 A | 12/1978 | Happel et al. |
| 4,136,328 A | 1/1979 | Cambern |
| 4,163,128 A | 7/1979 | Miskowicz |
| 4,197,919 A | 4/1980 | Redmond |
| 4,236,141 A | 11/1980 | Terabayashi et al. |
| 4,374,594 A | 2/1983 | Kawaharazaki |
| 4,432,119 A | 2/1984 | Schwark et al. |
| 4,451,958 A | 6/1984 | Robben et al. |

(Continued)

*Primary Examiner*—Peter C. English
(74) *Attorney, Agent, or Firm*—Sally J. Brown; James D. Erickson (57) ABSTRACT

A seat belt buckle switch is disclosed. This switch provides multiple discrete output states, including buckled, unbuckled, open loop and shorted. This switch works in association with a control module which uses the buckle switch state to detect a failure condition, execute an appropriate driver warning and, in an adaptive restraints application, to deploy other safety devices based on whether the seat belt is fastened.

14 Claims, 4 Drawing Sheets

U.S. PATENT DOCUMENTS

| | | |
|---|---|---|
| 4,458,916 A | 7/1984 | Yamada et al. |
| 4,553,625 A | 11/1985 | Tsuge et al. |
| 4,574,911 A | 3/1986 | North |
| 4,587,696 A | 5/1986 | Ueda et al. |
| 4,600,217 A | 7/1986 | Naumann et al. |
| 4,608,469 A | 8/1986 | Doty |
| 4,667,982 A | 5/1987 | Volk et al. |
| 4,742,886 A | 5/1988 | Sato |
| 4,750,244 A | 6/1988 | Saito |
| 4,754,105 A | 6/1988 | Doty et al. |
| 4,785,906 A | 11/1988 | Kang |
| 4,832,365 A | 5/1989 | Kawai et al. |
| 4,928,366 A | 5/1990 | Ballet |
| 4,966,394 A | 10/1990 | Thomas et al. |
| 4,978,138 A | 12/1990 | Hikone et al. |
| 5,109,199 A | 4/1992 | Berger |
| 5,123,673 A | 6/1992 | Tame |
| 5,133,425 A | 7/1992 | Han |
| 5,182,836 A | 2/1993 | Burkat |
| 5,218,746 A | 6/1993 | Yamanishi |
| 5,274,890 A | 1/1994 | Shimizu et al. |
| 5,359,756 A | 11/1994 | Miyauchi et al. |
| 5,375,304 A | 12/1994 | Miyauchi et al. |
| 5,387,029 A | 2/1995 | Hiramatsu et al. |
| 5,398,997 A | 3/1995 | McFalls |
| 5,400,867 A | 3/1995 | Müller et al. |
| 5,435,046 A | 7/1995 | Miyauchi et al. |
| 5,590,905 A | 1/1997 | Ellis et al. |
| 5,618,059 A | 4/1997 | Kim |
| 5,704,099 A | 1/1998 | Cahill |
| 5,742,986 A | 4/1998 | Corrion et al. |
| 5,749,130 A | 5/1998 | Bilyeu et al. |
| 5,752,299 A | 5/1998 | Vivacqua et al. |
| 5,765,774 A | 6/1998 | Maekawa et al. |
| 5,781,971 A | 7/1998 | Petersen, III |
| 5,912,612 A * | 6/1999 | Devolpi ................ 338/95 |

* cited by examiner

MULTIPLE OUTPUT BUCKLE SWITCH

BACKGROUND OF THE INVENTION

1. Field of the Invention

This invention relates to vehicle occupant safety restraint systems and devices. More specifically, this invention relates to seat belt restraint devices and in particular to buckle switches that sense whether a buckle is latched or unlatched and which provide appropriate signals for the various buckle latch states: buckled, unbuckled, short circuited, and open (damaged).

2. Description of Related Art

A variety of seat belt buckle switches have been developed and are well known in the art. Traditionally, these devices provide a normally closed switch that may drive a courtesy light in the instrument panel and/or an audible sound that indicates to the driver that the seatbelt is not fastened. Many prior switches can be disabled or shorted out by inserting a foreign object, such as a nail file, a knife blade, or a key into the buckle, thereby causing the switch to erroneously signal that the buckle is buckled.

For general background material, the reader is directed to the following United States Patents, each of which is hereby incorporated by reference in its entirety for the material contained therein.

U.S. Pat. No. 3,624,601 describes a safety seatbelt that is constructed so that a vehicle cannot be operated until the seatbelt is properly fastened about a person, and wherein the seatbelt is electrically connected to the ignition switch of a vehicle, so that the circuit cannot be completed and the engine operated until the seatbelt is properly connected in place.

U.S. Pat. No. 3,633,697 describes a vehicle safety device for use with a motorized vehicle to insure that the driver is in a safe and proper position to operate the vehicle. An interlock switch means is provided in a motive electrical system of the vehicle such as the ignition system. A driver-worn belt is provided having contact means associated therewith, which actuates the switch means to complete the motive electrical circuit only when placed under tension by the driver.

U.S. Pat. No. 3,665,385 describes a seat belt warning signal system that, when initiated, indicates that one or more seat belts provided for vehicle occupant's use is not fastened about the occupant. A switch in the warning signal electrical circuit is biased in a first position. The switch is forced into a second position, initiating the signal, when a locking member, provided in the retractor assembly, is disposed in its non-locking position corresponding to full belt retraction.

U.S. Pat. No. 3,718,902 describes a vehicle seat belt alarm and starter interlock control system, where a source of voltage is connected to a starter interlock through a normally open seat switch and a first normally closed seat belt actuated switch.

U.S. Pat. No. 3,729,059 describes a seat belt safety system for motor vehicles that has all of its seat belts as elements of a common electrical circuit operative to control the drive system of the vehicle and to prevent placing the vehicle in motion, unless and until the seat belt in each and every occupied seat of the vehicle, is buckled.

U.S. Pat. No. 3,737,850 describes a vehicle safety belt sensor system whereby the presence of an occupant in a vehicle seating position is sensed and used as a criterion for preventing the operation of the vehicle when a seat belt or harness at the occupied position is not in actual use.

U.S. Pat. No. 3,740,711 describes a warning system wherein a condition that is undesired by the vehicle operator is created if a seat belt is unfastened while the vehicle is in motion or, if a seat belt is fastened after the seat is vacated.

U.S. Pat. No. 3,748,640 describes a circuit that provides a safety belt system for both shoulder and seat belts that require the driver and any passengers to positively fasten the seat and shoulder harness in a sequential manner in order for the automobile to be started.

U.S. Pat. No. 3,756,339 describes a safety seat belt control apparatus, in which ends of the belt sections are carried on spring impelled retracting drums, the drums being normally locked against movement but provided with releasing solenoids. A switch is provided for completing a circuit when the buckle portions are engaged.

U.S. Pat. No. 3,757,293 describes an electronic seat belt control system that employs a simple Nand gate logic to require that the driver and passenger be seated prior to buckling their seat belts.

U.S. Pat. No. 3,766,612 describes a seat belt buckle that comprises a magnetic reed switch and a permanent magnet which are juxtaposed to each other in such a manner that the reed switch is subject to a magnetic field of the permanent magnet.

U.S. Pat. No. 3,767,134 describes an electrical sensor unit for mounting on a conventional safety belt retractor to provide an electrical signal to a "Fasten Safety Belts" light, that includes a housing for location on the retractor, a hub adapter, a ring gear cam, an actuator, and a set of normally open and normally closed contacts to signal whether or not the safety belt is buckled.

U.S. Pat. No. 3,770,225 describes a safety seat belt retractor, that may include electric switch elements that meter extraction length of the belt and signal proper belt fastening.

U.S. Pat. No. 3,770,919 describes a switch in a seat belt buckle, which operates upon insertion of the tongue of the buckle and operates under magnetic force when the tongue is not inserted in the buckle to give signal indication or interlock with the ignition.

U.S. Pat. No. 3,781,497 describes a vehicle seat belt buckle that is adapted for use in a warning system that comprises a buckle with a slot for receiving a tongue in locking engagement, which tongue upon insertion into the buckle depresses a plunger switch either from a closed circuit position to an open circuit position or from an open circuit position to a closed circuit position.

U.S. Pat. No. 3,787,804 describes a warning device that is operated by a driver or passenger in a vehicle who fails to fasten their safety belts and which limits the throttle opening of the vehicle engine to a predetermined maximum.

U.S. Pat. No. 3,806,867 describes an apparatus for detecting the proper utilization of a safety belt of a vehicle by a vehicle occupant, which includes a high frequency oscillator and at least one operatively connected sensing conductor in the safety belt and/or a seat of the vehicle.

U.S. Pat. No. 3,815,086 describes an automobile seat belt system that ensures that the belts of occupied seats are properly worn. The system compares the amount of belt withdrawn from an inertia reel with the position of the seat and the angle of the seat back, and if the amount of belt is outside the normal range or the angle of the belt is abnormal in respect to the driver's or any occupied passenger seat, a warning device is actuated when the vehicle speed exceeds a predetermined low speed.

U.S. Pat. No. 3,830,444 describes an automatic retractor for a vehicle seat belt that incorporates the means to lock the reel against belt withdrawal in the event of an accident and an electrical switch which is controlled by the length of belt withdrawn from the reel. The switch is adapted to be connected into a circuit, which warns the driver that the belt is not in use.

U.S. Pat. No. 3,831,140 describes an electrically operated personal safety system for vehicles, which makes use of seat belts, including shoulder belts, mandatory in order to obtain full use of the related vehicles.

U.S. Pat. No. 3,833,781 describes a switch for safety buckles, which is concealed from external tampering and view by location in the channel frame of the buckle and which is sensitive to the closure of the latch element on the tongue element.

U.S. Pat. No. 3,871,090 describes a safety belt buckle, which has a receptacle with a tongue-receiving passageway. A switch is provided to indicate the presence of the tongue in the passageway.

U.S. Pat. No. 3,891,272 describes a motor vehicle safety belt system that includes a switch actuated by the engagement of the driver's safety belt and a network for starting the vehicle engine upon the actuation of the switch.

U.S. Pat. No. 3,944,766 describes an electric switch, which is constructed, with the exception of two metallic conductors, entirely of elastomeric or thermoplastic materials wherein relative motion between switch operating parts is confined to a resilient deformation and wherein the switching function occurs within a sealed recess or chamber.

U.S. Pat. No. 3,956,603 describes a passive restraint system for an automotive vehicle or the like that includes a switch supported by a safety belt buckle. The switch is actuated in response to the placement of a tongue element connected to one end of a safety belt in a fixedly locked position relative to the buckle.

U.S. Pat. No. 3,963,090 describes a seat belt buckle automatic unlatching mechanism that includes a seat belt arrangement. A tongue latching mechanism is provided to automatically release the latching tongue when the motor vehicle engine has stalled, as due to an accident.

U.S. Pat. No. 3,969,795 describes a safety belt buckle with a laminated housing formed of top, center and bottom plates.

U.S. Pat. No. 4,000,385 describes an electric switch disposed in a cavity of a buckle.

U.S. Pat. No. 4,001,532 describes a buckle for safety belt that comprises a means for releasing a tongue plate inserted into the buckle body through an insertion opening.

U.S. Pat. No. 4,012,612 describes an electric switch that is disposed in a cavity of a buckle.

U.S. Pat. No. 4,027,362 describes a two-part vehicle safety buckle that has an integral metal pressing with a flat base and overturned side walls defining a socket.

U.S. Pat. No. 4,060,878 describes a buckle switch for use in automotive safety belt applications which is slidably located inside the buckle and in which an actuator is pivotally operated by the insertion of the tongue of the buckle.

U.S. Pat. No. 4,060,879 describes a safety belt buckle that includes a body member having a tongue receiving front opening, a floating latching member, which is swingable about a transverse axis between lock and unlock positions engaging and disengaging an inserted coupling tongue, and a push member which when depressed swings the latch member to the unlock position to release the tongue.

U.S. Pat. No. 4,064,603 describes an inexpensive safety belt buckle of relatively small size and lightweight.

U.S. Pat. No. 4,136,328 describes a tamper-proof electrical circuit for a motor vehicle seat belt system that may be used with a seat belt system requiring the driver and passenger of the motor vehicle to fasten their respective seat belts if the vehicle engine is to be started.

U.S. Pat. No. 4,060,879 describes a safety belt buckle that includes a body member having a tongue receiving front opening, a floating latching member, which is swingable about a transverse axis between lock and unlock positions engaging and disengaging an inserted coupling tongue, and a push member which when depressed swings the latch member to the unlock position to release the tongue.

U.S. Pat. No. 4,064,603 describes an inexpensive safety belt buckle of relatively small size and lightweight.

U.S. Pat. No. 4,128,924 describes a seat belt buckle having a laminated construction.

U.S. Pat. No. 4,136,328 describes a tamper-proof electrical circuit for a motor vehicle seat belt system that may be used with a seat belt system requiring the driver and passenger of the motor vehicle to fasten their respective seat belts if the vehicle engine is to be started.

U.S. Pat. No. 4,163,128 describes a safety belt buckle having an electrical switch means located beneath the buckle base of the buckle and operable by insertion of a tongue plate into latching engagement with a latching mechanism within the buckle.

U.S. Pat. No. 4,197,919 describes a seat belt safety system for motor vehicles wherein all seat belts of the vehicle are elements of a common electrical circuit operative to control the drive system of the vehicle, but independent from the operation of the vehicle's engine, wherein an unbuckled seat belt in any occupied seat of the vehicle will automatically prevent putting the vehicle in motion, except in reverse gear or the lowest forward gear.

U.S. Pat. No. 4,236,141 describes an automatic mounting and alarming circuit for a seat belt of a vehicle capable of automatically fastening the seat belt to a rider of the vehicle upon sitting on the seat, as well as warning the rider of a state where the seat belt is not or can not be fastened.

U.S. Pat. No. 4,374,594 describes an emergency buckle device used in a seatbelt system wherein the outer end of an occupant restraining webbing is engaged with a door, whereby the intermediate portion of the webbing is adapted to approach or recede from the seated occupant in accordance with the closing or opening action of the door so as to automatically fasten the webbing to or unfasten same from the occupant.

U.S. Pat. No. 4,432,119 describes an electrically released seat belt buckle that comprises a housing, an opening in the housing adapted to receive a cooperating tongue having a locking portion, a locking member provided in the housing for locking engagement with the locking portion of the tongue when the tongue is inserted into the opening, and a releasing mechanism for releasing the locking member from the locking engagement with the locking portion of the tongue.

U.S. Pat. No. 4,451,958 describes a seat belt buckle locking element or latch having a metal plate, a first pair of articulation tabs, and a second pair of tabs to receive strains, these tabs being received in corresponding openings formed in the flanges of the base.

U.S. Pat. No. 4,458,916 describes an automatic seat belt device for a vehicle, which has a switch inserted into a driving circuit for opening the driving circuit upon releasing of an emergency buckle.

U.S. Pat. No. 4,553,625 describes a seat belt system that comprises a seat belt retractor, a seat belt, a tongue plate secured at an intermediate position of the seat belt, and a buckle, which has a locking function and an unlocking function for the tongue plate.

U.S. Pat. No. 4,574,911 describes a seat belt buckle emergency release system that provides for an emergency release of the seat belt in the event of the motor vehicle sustaining an impact of sufficient magnitude.

U.S. Pat. No. 4,587,696 describes a buckle for a seat belt that includes a latch piece pivotably supported by a buckle body.

U.S. Pat. No. 4,600,217 describes an apparatus for automatically moving the tongue of a seat belt into a position in which it may conveniently be grasped by an operator for insertion into a buckle.

U.S. Pat. No. 4,608,469 describes a safety belt buckle that includes a switch, which comprises a compact, substantially enclosed subassembly.

U.S. Pat. No. 4,667,982 describes a safety belt system that comprises a belt displacer, which is so constructed as to transport a section of the safety belt between a retracted position and a seizing portion.

U.S. Pat. No. 4,742,886 describes a seat belt apparatus that comprises an engaging device attached to a seat belt, a buckle device engagable with the engaging device, and a device for releasing the engagement between the engaging device and the buckle device in association with the opening operation of a door.

U.S. Pat. No. 4,750,244 describes a buckle that is constructed of a tongue, a base, a latch means capable of selectively taking either a latching state, in which the tongue is connectable to the base, or a non-latching state in which the tongue is released from the base, an operation means for bringing the latch means from the latching state to the non-latching state, a casing defining at least a tongue-inserting opening and an operation-means operating opening, and an actuator means capable of taking a first state while the tongue is connected to the base by the latch means in its latching state or a second state while the tongue is released from the base.

U.S. Pat. No. 4,754,105 describes a safety belt buckle including a switch, which is preferably located between the buckle frame and a bottom cover of the buckle.

U.S. Pat. No. 4,785,906 describes a seat belt buckling system that has a switch mechanism in the seat belt anchor plate to prevent the starting of the engine until the seat belt has been buckled.

U.S. Pat. No. 4,832,365 describes a passive seat belt system that includes a timer and a control means, with the timer reaching a time-up state upon an elapsed time of a predetermined interval of time after closure of an associated door and releasing the time-up state upon opening of the door.

U.S. Pat. No. 4,928,366 describes a buckle intended to join a belt to an anchorage point that consists of a latch and of a keeper, which is comprised of a base, a lock, an ejector guide, an actuating button, preferably a protective covering, a closure detector and an illumination device.

U.S. Pat. No. 4,966,394 describes a safety restraint system for a vehicle that comprises a safety belt having a seat belt portion connected to a buckle and a shoulder belt portion connected to a motorized retractor, which includes a reversible motor.

U.S. Pat. No. 4,978,138 describes a safety arrangement for a driver's seat in an automotive vehicle having a steering column extending to the driver's seat.

U.S. Pat. No. 5,109,199 describes a seat belt buckle monitor switch that has a cooperative circuit for indicating the closed state of a seat belt buckle in a motor vehicle.

U.S. Pat. No. 5,123,673 describes a seat belt system for use with a vehicle seat, which includes a three point belt system forming a lap belt and a shoulder belt and further includes a second shoulder belt to form a four point system.

U.S. Pat. No. 5,133,425 describes a passive seat belt system that includes a seat belt buckle of a receptacle device having a connecting switch member connected to a battery of a vehicle and a tongue of a webbing so that the vehicle can be actuated or not in response to fastening or unfastening of a seat occupant.

U.S. Pat. No. 5,182,836 describes a pressure activated seat belt locking device for allowing an operator form a remote location to control the locking or unlocking of seat belts such as those used on amusement park type rides.

U.S. Pat. No. 5,218,746 describes a buckle of a seat belt device, for securing a tongue of the seat belt device, that comprises an insertion path into which the tongue is inserted and a latch unit, provided in the insertion path, for hindering a removal of the tongue.

U.S. Pat. No. 5,274,890 describes a seat belt tongue retaining device, which comprises a buckle unit having an insertion passage into which a tongue is inserted, and a latch pawl capable of getting into and out of the insertion passage.

U.S. Pat Nos. 5,359,756, 5,375,304, and 5,435,046 describe an automatic buckling device that includes a tongue and a buckle, which includes a solenoid provided at the forward end so as to attract the tongue face plate.

U.S. Pat. No. 5,387,029 describes a buckle pretensioner for a vehicle seat belt system of the type that is mounted on a vehicle seat and includes a blocking device for preventing the movement of a movable member of an inertial starting mechanism that controls the operation of the pretensioner.

U.S. Pat. No. 5,398,997 describes a seat belt system for restraining a vehicle occupant, that includes a retractor, a first and second locking tongue, and a buckle.

U.S. Pat. No. 5,400,867 describes a restraining system for occupants of a motor vehicle that includes a safety belt and an airbag.

U.S. Pat. No. 5,590,904 describes a dual resistance switch for buckle confirmation for a vehicle occupant restraint system.

U.S. Pat. No. 5,618,059 describes a seat belt buckle device for a vehicle that includes a lower stay having a guide slot, a C-shaped impact-absorbing plate fixed to the lower stay at a lower wall, and an upper stay having a switch connector and fixed to an upper wall of the impact-absorbing plate.

U.S. Pat. No. 5,704,099 describes a seat belt buckle for use with a seat belt pretensioner that has an inertia locking mechanism.

U.S. Pat. No. 5,742,986 describes a seat belt buckle that includes a latch mechanism and a Hall effect assembly.

U.S. Pat. No. 5,749,130 describes a locking seat belt buckle assembly configured for placement and operation within a standard seat belt buckle and tongue.

U.S. Pat. No. 5,752,299 describes a seat belt buckle that comprises a frame, and a locking element moveable disposed on the frame and moveable between an unlocked position and a locked position.

U.S. Pat. No. 5,765,774 describes a seat belt retractor that employs an ultrasonic motor.

U.S. Pat. No. 5,781,971 describes a seat belt buckle that includes a latch mechanism, a pushbutton, an inertia member and a spring.

SUMMARY OF THE INVENTION

It is desirable to provide a seat belt buckle switch that is capable of more than two non-zero discrete output states, including whether the belt is buckled, unbuckled and switch failure. Moreover, it is desirable to provide a seat belt buckle switch that provides a discrete signal to indicate the seat belt buckle state.

Therefore, it is the general object of this invention to provide a seat belt buckle switch that is capable of more than two non-zero discrete output states.

It is a further object of this invention to provide a seat belt buckle switch capable of communicating a signal to a vehicle restraints control module.

An additional object of this invention is to provide a seat belt buckle switch that provides distinct signals for buckled, unbuckled, and failure modes of the seat belt switch.

A further object of this invention is to provide a seat belt buckle switch that cooperates with a control module to detect and diagnose a failure condition and execute an appropriate driver warning.

A still further object of this invention is to provide a seat belt buckle switch that can provide accurate sensing during high belt loads, as would be present during a crash.

These and other objectives of this invention, which are readily apparent to those of ordinary skill in the art upon review of the following drawings, detailed description, claims and abstract are achieved by a resistive switch element that communicates at least the following belt buckle states: buckled, unbuckled, open loop and short circuit.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings:

FIGS. 4(a)–4(e) depict the detailed mechanical drawings of the preferred switch of this invention.

Reference will now be made in detail to the present preferred embodiment of the invention, an example of which is illustrated in the accompanying drawings.

DETAILED DESCRIPTION OF THE INVENTION

Figure 1:
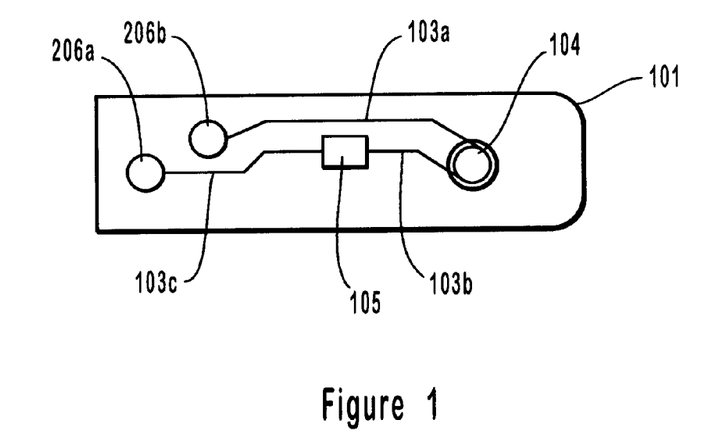
FIG. 1 depicts the preferred switch body diagram.

FIG. 1 shows a diagram of the switch body of the preferred embodiment of this invention. The switch body 101 holds a first wire terminal 206b and a second wire terminal 206a. A first conductive path 103a electrically connects the first wire terminal 206b with a switching device 104. The switching device 104, in turn, is connected by a second conductive path 103b with a resistive circuit 105. The resistive circuit 105 is then connected to the second wire terminal 206a via a third conductive path 103c. The switching device 104 is preferably comprised of a flexible metal member and a shorting pad, between which an air gap is maintained when the buckle is in an unbuckled state. When the buckle is buckled, the flexible metal member 104 is deflected bringing the flexible metal member and the shorting pad in direct electrical contact and thereby modifying the resistance of the circuit as measured at the first and second wire terminals 206b,a.

Figure 2:
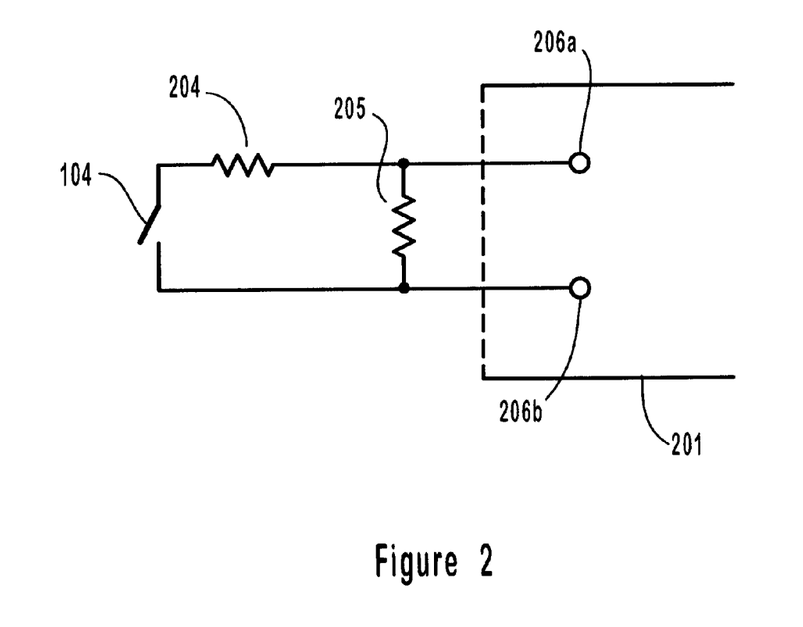
FIG. 2 depicts the preferred circuit diagram and output circuit.

FIG. 2 shows the preferred circuit diagram and output circuit of this invention. The preferred resistive circuit 105 is typically electrically connected to a control module 201, which in an adaptive restraints application, monitors the switch resistance so that, in the event of a vehicle crash, the control module 201 can deploy other safety devices based on whether or not the occupant is belted, as determined from the resistance of the switch. The control module 201 may also use the measured resistance values from the switch to light courtesy lights in the vehicle to encourage the use of the seat belt. Electrically, typically and preferably, the control module connects to the resistive circuit 105 by the wire terminals schematically depicted in FIG. 2 as 206a,b. The dome switch 104 is shown schematically as a switch. The present preferred resistive circuit 105 itself comprises two resistors R1 205 and R2 204, which are electrically in parallel when the dome switch 104 is closed and which have approximately equal resistance values. This preferred resistive circuit 105 provides four resistance determinative states. (1) A buckled state. When the latch plate/tongue is inserted in the buckle, the dome switch 104 is closed, thereby establishing an equivalent resistance $R_{EQ}$ due to the parallel combination of R1 205 and R2 204. In the buckled state $R_{EQ}$ is non-zero, but relatively low. (2) The unbuckled state. When no latch plate/tongue is inserted in the switch, the dome switch 104 remains open, thereby establishing an equivalent resistance $R_{EQ}$ equal to R1 205. Therefore, in the unbuckled state $R_{EQ}$ is non-zero and relatively high. (3) Open Loop state. In the event that the resistive circuit or the switch is broken, the $R_{EQ}$ is expected to be equal to an open circuit, or approximately infinite. (4) Shorted switch condition. On occasion the switch may be shorted out, either intentionally by the user or unintentionally by accident. A shorted switch may defeat or impair the operation of the control module 201. In a shorted switch condition the $R_{EQ}$ is equal to approximately zero. In sum, each condition, buckled, unbuckled, open and shorted, is detectable by the control module 201 by measuring the relative resistance of the resistive circuit 105.

Figure 3:
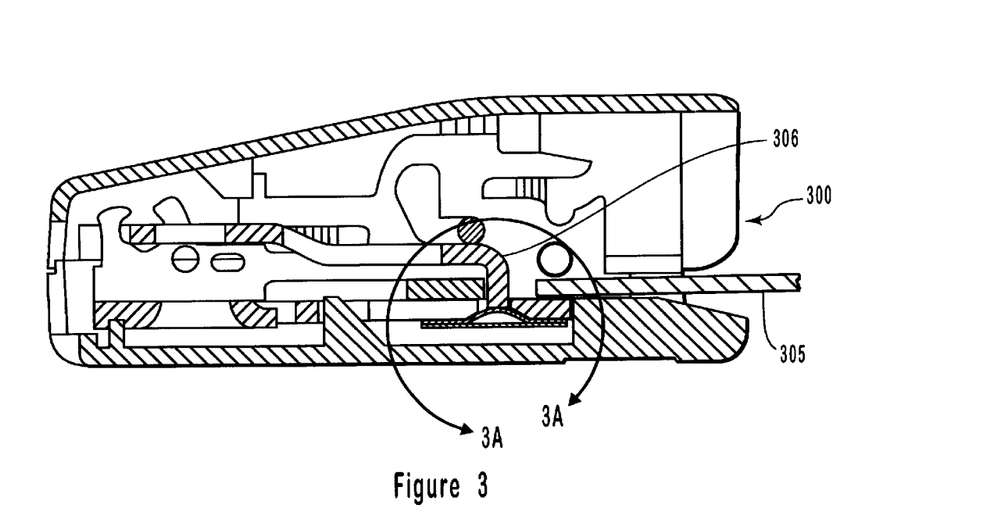
FIG. 3 depicts a preferred seat belt buckle having the switch of this invention.
Figure 3A:
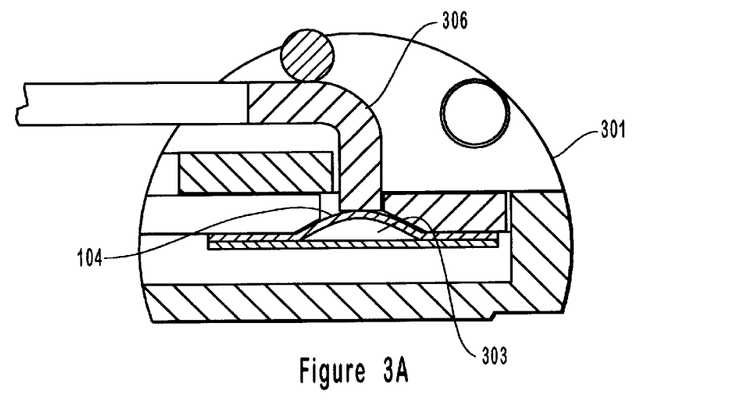
Figure 3B:
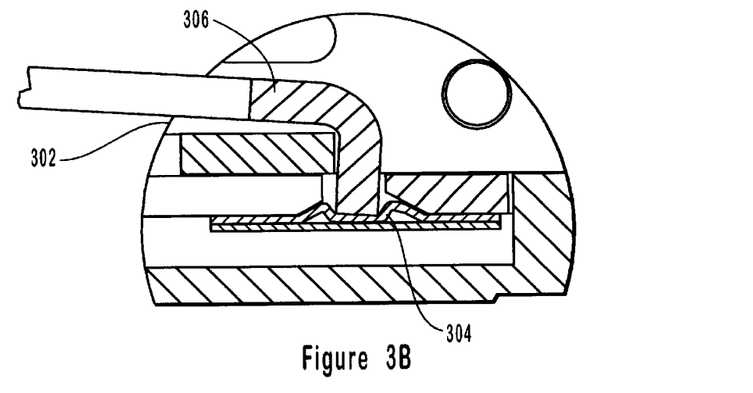
Figure 4A:
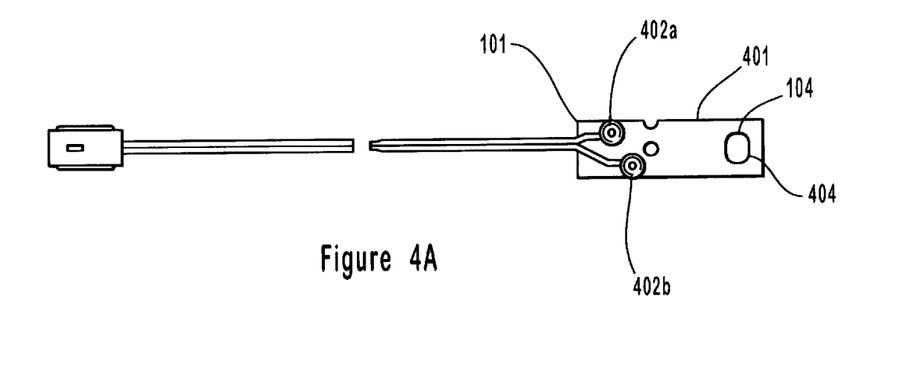
Figure 4B:
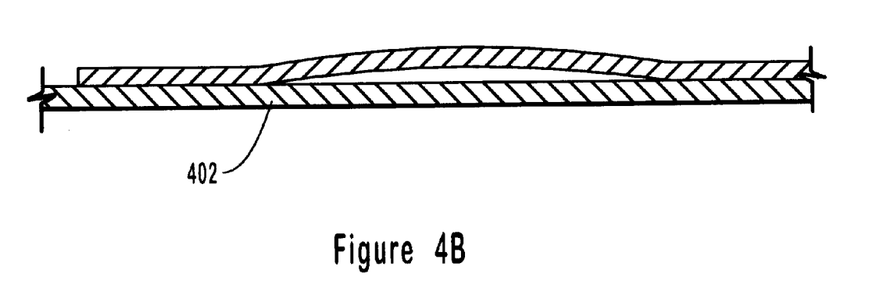
Figure 4C:
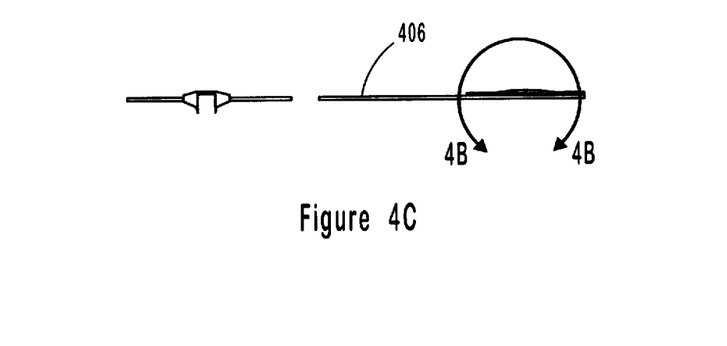
Figure 4D:
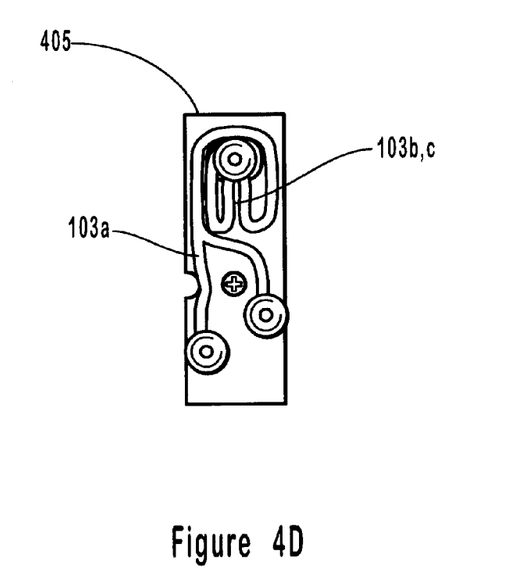
Figure 4E:
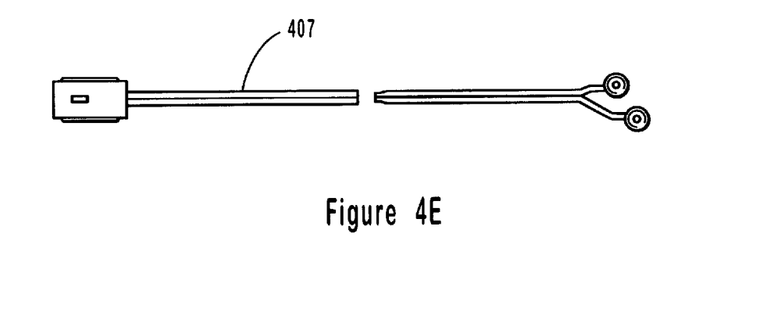

FIG. 3 shows a seat belt buckle 300 having the preferred switch of this invention. The buckle latch plate/tongue 305 being inserted into the buckle 300 causes the latch 306 to impose force on the flexible metal member 104, thereby closing the circuit and indicating the buckling to the control module 201. Two inserts 301, 302 are shown in FIG. 3. Insert 301 shows a detail perspective of the switch membrane 303 with the buckle tongue 305 not inserted and therefore, with the latch 306 out of contact with the dome switch 104. Insert view 302 shows the latch 306 in contact with the dome switch 104 placing the flexible metal member in a deflected closed condition 304.

FIGS. 4(a)–4(e) show a variety of views of the mechanical assembly drawings of the preferred embodiment of this invention. The detail of the switch body 101 is shown having placement 402a,b for the wire terminals 206a,b, as well as 404 for the switching device 104 and 401 for the insertion of the preferred resistive circuit 105. View 405 shows additional detail of the conductive paths 103a,b,c. And, side views 402, 406 show the side view depicting the dome switch 104. Additional detailed mechanical dimensions are shown in view 407 of the switch body.

The described preferred embodiments are to be considered in all respects only as illustrative and not as restrictive. Although the embodiments shown here include specific component values, shapes and dimensions, the invention is not limited thereto. The scope of this invention is, therefore, indicated by the appended claims rather than by the foregoing description. All changes, which come within the meaning and range of equivalency of the claims, are to be embraced as within their scope.

We claim:

1. A seat belt buckle assembly, comprising:
   (A) a switch body held within a seat belt buckle;
   (B) a switch mounted on said switch body wherein said switch comprises a flexible, dome-shaped metal membrane;
   (C) a resistive circuit mounted on said switch body and electrically connected to said switch; and
   (D) a control module electrically connected to said resistive circuit wherein said control module detects buckle states selected from the group consisting of buckled, unbuckled, open loop, and shorted.

2. A seat belt buckle assembly, as recited in claim 1, further comprising one or more wire terminals for connecting said resistive circuit to said control module.

3. A seat belt buckle assembly, as recited in claim 1, wherein said switch is a deflectable dome switch.

4. A seat belt buckle assembly, as recited in claim 1, wherein said resistive circuit further comprises a plurality of resistive components.

5. A seat belt buckle assembly, as recited in claim 4, wherein said plurality of resistive components are arranged in a parallel circuit arrangement when said switch is closed.

6. A seat belt buckle assembly, as recited in claim 4, wherein said plurality of resistive components have approximately equal resistance values.

7. A seat belt buckle assembly, comprising:
   (A) a seat belt buckle having a tongue and a latch, said tongue adapted to be received in said seat belt buckle;
   (B) a switch held within said seat belt buckle having a flexible dome-shaped metal membrane positioned to contact said latch; and
   (C) a control module electrically connected to said switch.

8. A seat belt buckle assembly, as recited in claim 7, further comprising a resistive circuit electrically connected to said switch.

9. A seat belt buckle assembly, as recited in claim 8, wherein said resistive circuit further comprises a plurality of resistive elements.

10. A seat belt buckle assembly, as recited in claim 9, wherein said plurality of resistive elements are electrically connected together in a parallel circuit arrangement when said switch is closed.

11. A seat belt buckle assembly, as recited in claim 10, wherein said switch is closed by deflection of said membrane.

12. A seat belt buckle assembly, as recited in claim 8, wherein said control module detects buckle states selected from the group consisting of buckled, unbuckled, open loop and shorted.

13. A seat belt buckle assembly, comprising:
    (A) a switch body held within a seat belt buckle;
    (B) a switch mounted on said switch body wherein said switch comprises a flexible, dome-shaped metal membrane;
    (C) a plurality of resistive components mounted on said switch body and electrically connected to said switch, said plurality of resistive components being arranged in a parallel circuit arrangement when said switch is closed; and
    (D) a control module electrically connected to said resistive circuit.

14. A seat belt buckle assembly, comprising:
    (A) a switch body held within a seat belt buckle;
    (B) a dome switch mounted on said switch body, the switch comprising a flexible, dome-shaped metal membrane; and
    (C) a resistive circuit mounted on said switch body.

* * * * *